Figure 1:
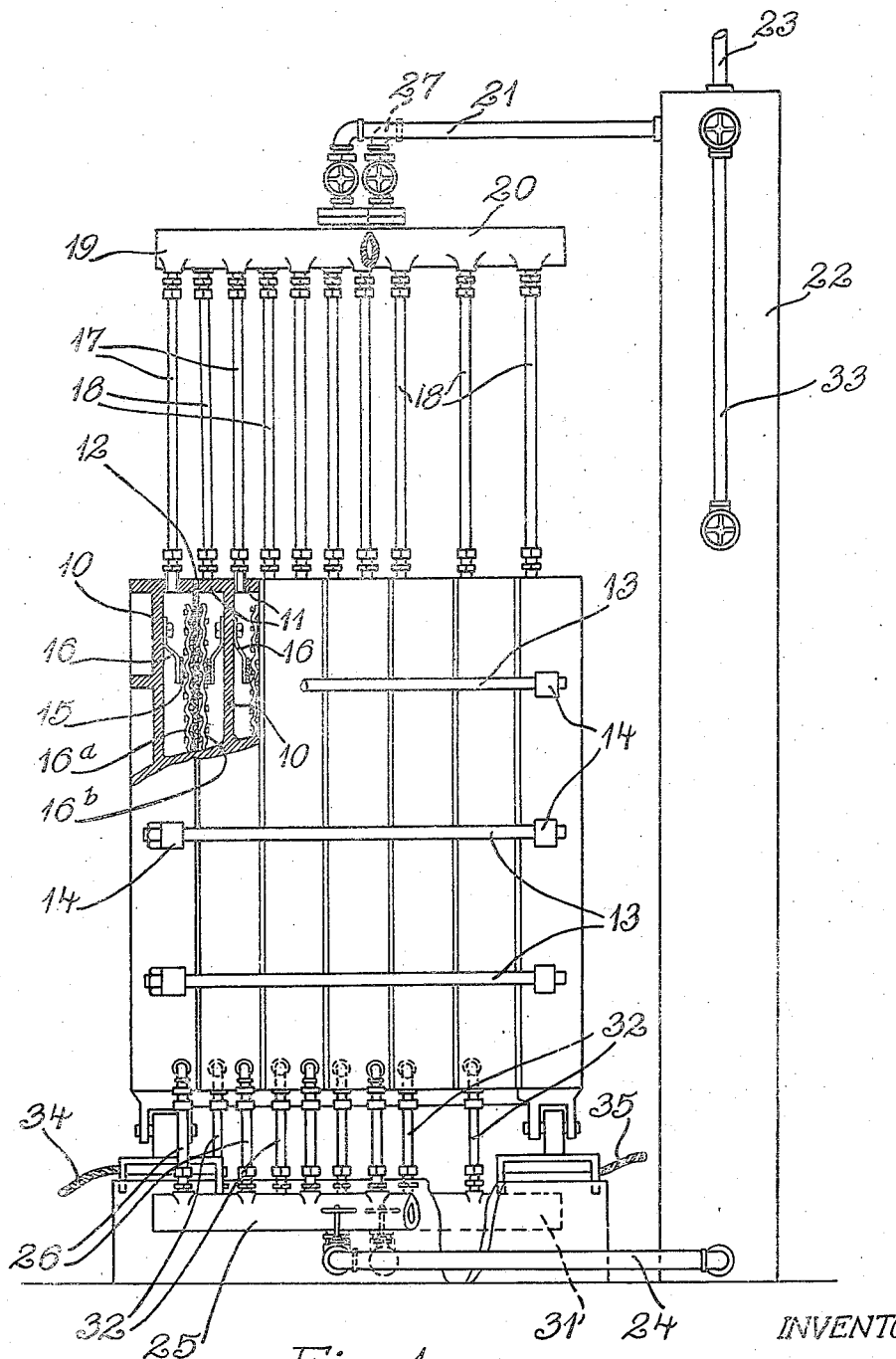

Feb. 27, 1923.

F. G. CLARK.
MANUFACTURE OF HYDROGEN AND OXYGEN.
ORIGINAL FILED AUG. 29, 1919.

1,446,736.

2 SHEETS—SHEET 1.

INVENTOR
Farley. G. Clark.
BY
his ATTORNEY

Patented Feb. 27, 1923.

1,446,736

UNITED STATES PATENT OFFICE.

FARLEY GRANGER CLARK, OF TORONTO, ONTARIO, CANADA.

MANUFACTURE OF HYDROGEN AND OXYGEN.

Application filed August 29, 1919, Serial No. 320,724. Renewed March 21, 1921. Serial No. 453,990.

*To all whom it may concern:*

Be it known that I, FARLEY GRANGER CLARK, citizen of the United States, residing at Toronto, county of York, Province of Ontario, Canada, have invented certain new and useful Improvements in the Manufacture of Hydrogen and Oxygen; and I do hereby declare the following to be a full, clear, and exact description of the invention, such as will enable others skilled in the art to which it appertains to make and use the same.

This invention relates to the manufacture of hydrogen and oxygen; and it has to do more particularly with a method of producing hydrogen and oxygen by electrolytic decomposition of water wherein substantially higher current densities are employed than have been employed heretofore for this purpose, thus enabling large increase in the rate of output per unit area of electrolyte cross section between electrodes.

Electrolytic decomposition of water for production of hydrogen and oxygen has been characterized heretofore by the employment of relatively very low current densities, generally not exceeding 0.2 or 0.25 ampere per square inch of projected electrode area. There have been occasional proposals to operate at as high as 0.5 ampere density; but so far as I am aware, such proposals have never been favorably entertained in the practical art. This is apparently because certain complications attending operation at high current densities under the conditions heretofore suggested, have had the effect of discouraging attempts in this direction. After extensive investigation of the subject, however, I have found that under proper conditions, to be set forth hereinafter, operation at current densities greatly in excess of those commonly used prior to my invention is not only feasible but offers certain distinct advantages in addition to augmenting the rate of output.

In order to establish the conditions necessary to operate successfully at the relatively high current densities here in question, it is essential to properly correlate character and spacing apart of electrodes, with operating temperature of electrolyte. It is in the discovery of this relation and its utilization in a practical process that the present invention largely consists.

Provision should be made to facilitate disengagement and removal of the generated gases from between the active faces of the electrodes. This is especially important in view of the greatly increased rate of gas evolution due to the higher current densities. I therefore employ electrodes permeable by the evolved gases and so arranged that electrolyte may circulate freely upward in planes somewhat to the rear of but adjacent to the active electrode faces. By employing electrodes of this character, passage of the gas rearward as well as upward is facilitated, and excessive polarization effects are avoided. The expression "permeable electrode" is here used in a broad sense to denote an electrode composed of such material or having such mechanical construction that gas may pass rearward from its front or active face. That is, the material composing the electrode may itself be sufficiently porous to permit passage of gas directly therethrough; or the electrode may be apertured, as in the case of electrodes made of wire mesh or of metal strips, in such manner as to facilitate such passage.

It is desirable also that the electrodes be as close together as practicable. In practice I find it advisable to have them not more than one-fourth of an inch apart; and a smaller spacing distance, say one-eighth of an inch, is distinctly better. Where the hydrogen and oxygen are to be separately collected, the employment of a separating diaphragm is a practical necessity. If a non-conducting diaphragm be used, it may be of porous material suitably resistant to the action of the electrolyte, such as woven asbestos cloth about one-eighth of an inch thick; and in such case, the electrodes may directly engage the opposite sides of the diaphragm.

In practicing the invention it is very desirable to operate with the elctrolyte relatively hot, since not only does this increase the conductivity of the electrolyte and thus require the application of less voltage to pass a given volume of current than would otherwise be necessary, but also because it has the additional function of greatly facilitating prompt disengagement of the generated gas from the electrodes, and rapid separation of the gas bubbles from the electrolyte. The electrolyte employed is a water solution of a base or an acid. A solution of caustic soda, containing about 17 per cent NaOH offers certain advantages and is at present preferred. Maintenance of the electrolyte at the desired high temperature can be effected wholly or largely through the heat developed by the passage of the current therethrough; and to this end the electrolyzing cell or cells may be heat insulated to minimize heat losses by radiation, etc. For good results the temperature of the electrolyte should be at least 50° or 60° C. in practicing the present method, and higher temperatures, up to say 95° C. or thereabouts are often to be recommended, these higher temperatures being especially effective in ensuring very rapid passage of gas bubbles through and from the electrolyte. In any case the temperature should be somewhat below the boiling point of the electrolyte at the operating pressure, in order to avoid excessive energy losses by generation of steam. The normal boiling point of the electrolyte may be increased by operating under pressure, thus making possible the employment of still higher current densities; but I consider operation at about ordinary atmospheric pressure more desirable in practice. Within limits, the temperature of the electrolyte can be varied by varying the operating voltage. An increase in voltage increases the current flow and also the heating effect, thus raising the temperature of the electrolyte. But this decreases the resistance of the electrolyte and consequently further increases the current; so that the effect is cumulative. A condition of equilibrium is of course attained when the heat losses by radiation, etc., overbalance the generation of heat by the current.

At present I consider operation at from say 1.5 to 3 amperes per square inch of projected electrode area that is, of the cross section of the current path between cooperating electrodes of a couple especially desirable in carrying out the new method herein described. If densities as high as 4 or 5 amperes or more per sq. inch are used it is generally necessary to ensure rapid circulation of the electrolyte as by means of a pump, for example.

While the method may be carried out in any suitable electrolyzing apparatus of the general type above referred to, reference is here made, for the sake of an example, to U. S. Patent No. 1,269,566 to MacDougall and Middleton, as disclosing one form of apparatus by means of which the present method may be practiced.

Figure 2:
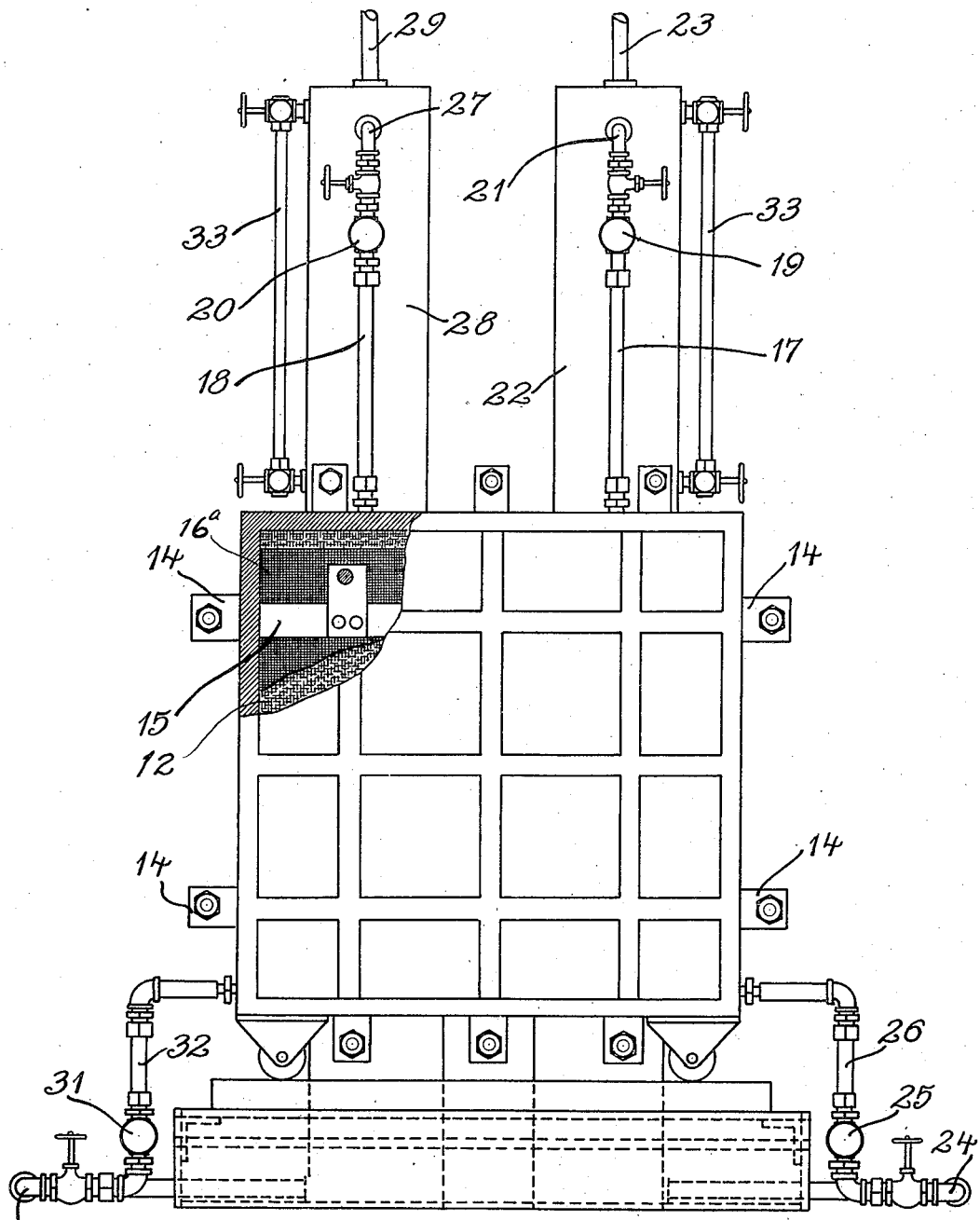

An example of apparatus suitable for this purpose is illustrated in the accompanying drawings, in which Fig. 1 is a side elevation, partly broken away and in section, illustrating a complete installation, and Fig. 2 is an end view, also partly broken away and in section.

Referring to the drawings, which illustrate a 6-cell unit suitable for the purposes in view, 10 are cell walls provided with double flanges 11, between which flanges are inserted the margins of asbestos cloth diaphragms 12, the assemblage being held tightly clamped together by means of insulated coupling bolts 13, passing through apertured lugs 14 with which the flanges of the end cell walls are provided. Carried on distributing bars 15, which in turn are supported on the cell walls by means of brackets 16, are the permeable or foraminous electrode members $16^a$ and $16^b$ of each cooperating couple. In this instance, these electrode members consist of metallic wire mesh fabric, and it will be seen that by means of the described arrangement they are supported in such manner that they lie substantially against opposite sides of the separating diaphragm and are spaced away from the respective cell walls, leaving space for free circulation of electrolyte and for passage of gas between each said electrode member and the corresponding cell wall upon which it is mounted. Gas and electrolyte offtakes 17 and 18 connect each half-cell with headers 19 and 20, respectively. Assuming $16^a$ to be anodes and $16^b$ to be cathodes, in the assemblage of bi-polar electrodes in this filter press type of construction, anolyte and oxygen pass upward through offtakes 17 into header 19; while catholyte and hydrogen pass upward through offtakes 18 into header 20. From header 19 anolyte and oxygen pass through conduit 21 into a separating tank 22, in the upper part of which oxygen collects and is conducted through outlet 23 to any suitable place of storage or use; while the separated electrolyte is led back through conduit 24 from the base of the separating tank into a header or manifold 25, and thence through individual pipes 26, into the lower part of each anode compartment or cell. Similarly, hydrogen and catholyte pass from header or manifold 20 through conduit 27 into the upper part of separating tank 28, hydrogen being led away through outlet pipe 29, and electrolyte being returned through pipe 30, manifold 31, and individual pipes 32, into the lower parts of each cathode compartment or half-cell. The separating tanks are provided with gage glasses 33 as shown. The various intakes and offtakes should be suitably insulated from the main cell structure; and the offtakes 17, 18, may desirably be of such relatively small diameter as compared to their length as to utilize the lifting effect of the evolved gases to induce rapid circulation of both anolyte and catholyte through the cell compartments. Current leads 34, 35 are provided for connection to suitable supply mains.

In a typical instance, using a 17 per cent caustic soda electrolyte maintained at about 75° to 85° C., and with an asbestos cloth diaphragm spacing the electrodes one-eighth inch apart, operation at a current density of about 2 amperes per square inch requires slightly over 2 volts per cell, and the yield of oxygen and hydrogen is excellent both in quantity and purity. This example is not intended to be limiting but merely illustrates a practical embodiment of the principles involved. By running with the electrolyte at 90° to 95° C., a comparatively slight increase in the voltage, say to 2.5 volts enables operation at about 3 amperes density and a corresponding increase in rate of output.

What I claim is:—

1. The method of manufacturing hydrogen and oxygen electrolytically which comprises passing current between electrodes immersed in a suitable aqueous electrolyte, at a voltage operative to decompose water with production of hydrogen and oxygen and at a current density exceeding one ampere per square inch of cross section of the current path between said electrodes, and collecting the evolved gases.

2. The method of manufacturing hydrogen and oxygen electrolytically which comprises passing current between electrodes, immersed in a suitable aqueous electrolyte, at a voltage operative to decompose water with production of hydrogen and oxygen and at a current density of not less than about 2 amperes per square inch of cross section of the current path between said electrodes, and collecting the evolved gases.

3. The method of manufacturing hydrogen and oxygen electrolytically which comprises passing a current between permeable electrodes immersed in a suitable aqueous electrolyte, at a voltage operative to decompose water with production of hydrogen and oxygen, and at a current density exceeding one ampere per square inch of cross section of the current path between said electrodes, said permeable electrodes being of such character as to permit circulation of lectrolyte at a locality to the rear of their adjacent faces, and collecting the evolved gases.

4. The method of manufacturing hydrogen and oxygen electrolytically which comprises passing current between permeable electrodes, immersed in a suitable aqueous electrolyte at a voltage operative to decompose water with production of hydrogen and oxygen, and at a current density exceeding one ampere per square inch of cross section of the current path between said electrodes, said permeable electrods having their adjacent faces spaced apart not to exceed one-fourth inch and separated by a permeable diaphragm, and being of such character as to permit circulation of electrolyte at a locality to the rear of their adjacent faces, and collecting the evolved gases.

5. The method of manufacturing hydrogen and oxygen electrolytically which comprises passing a current between permeable electrodes immersed in a suitable aqueous electrolyte, at a voltage operative to decompose water with production of hydrogen and oxygen, and at a current density exceeding one ampere per square inch of cross section of the current path between said electrodes while maintaining the temperature of the electrolyte above 50° C., said permeable electrodes having their adjacent faces separated by a porous diaphragm and being of such character as to permit circulation of electrolyte at a locality to the rear of their adjacent faces, and collecting the evolved gases.

6. The method of manufacturing hydrogen and oxygen electrolytically which comprises passing current between electrodes immersed in a suitable aqueous electrolyte, at a voltage operative to decompose water with production of hydrogen and oxygen and at a current density exceeding one ampere per square inch of cross section of the current path between said electrodes, and collecting the evolved gases, while maintaining the electrolyte about 50° C.

7. The method of manufacturing hydrogen and oxygen electrolytically which comprises passing current between electrodes immersed in a suitable aqueous electrolyte, at a voltage operative to decompose water with production of hydrogen and oxygen and at a current density approximating 2 amperes per square inch of cross section of the current path between said electrodes, and collecting the evolved gases, while maintaining the electrolyte at about 75° to 85° C.

8. The method of manufacturing hydrogen and oxygen which comprises electrolyzing water at a current density exceeding one ampere per square inch and maintaining a forced circulation of the electrolyte.

9. The method of manufacturing hydrogen and oxygen which comprises electrolyzing water at high current density and at a temperature approximating the boiling point of the electrolyte.

10. The method of manufacturing hydrogen and oxygen which comprises electrolyzing water at a current density lying within the approximate limits of 1.5 and 3 amperes per square inch.

In testimony whereof I hereunto affix my signature.

FARLEY GRANGER CLARK.